(12) United States Patent
Fourtet et al.

(10) Patent No.: US 9,049,732 B2
(45) Date of Patent: Jun. 2, 2015

(54) METHOD FOR USING A SHARED FREQUENCY RESOURCE, METHOD FOR MANUFACTURING TERMINALS, TERMINALS AND TELECOMMUNICATION SYSTEM

(75) Inventors: Christophe Fourtet, Pompignan (FR); Thierry Bailleul, Toulouse (FR)

(73) Assignee: SIGFOX, Labege (FR)

( * ) Notice: Subject to any disclaimer, the term of this patent is extended or adjusted under 35 U.S.C. 154(b) by 207 days.

(21) Appl. No.: 13/702,206

(22) PCT Filed: Jun. 8, 2011

(86) PCT No.: PCT/EP2011/059538
§ 371 (c)(1),
(2), (4) Date: Feb. 11, 2013

(87) PCT Pub. No.: WO2011/154466
PCT Pub. Date: Dec. 15, 2011

(65) Prior Publication Data
US 2013/0142191 A1    Jun. 6, 2013

(30) Foreign Application Priority Data

Jun. 8, 2010  (FR) .................................... 10 54509
Aug. 20, 2010 (FR) .................................... 10 56703

(51) Int. Cl.
| H04W 74/08 | (2009.01) |
| H04J 1/12 | (2006.01) |
| H04B 7/00 | (2006.01) |
| H04B 3/32 | (2006.01) |
| H04B 3/44 | (2006.01) |
| H04B 1/10 | (2006.01) |
| G06F 17/14 | (2006.01) |

(52) U.S. Cl.
CPC ........ *H04W 74/085* (2013.01); *Y10T 29/49002* (2015.01); *H04B 7/00* (2013.01); *H04B 3/32* (2013.01); *H04B 3/44* (2013.01); *H04B 1/10* (2013.01); *G06F 17/14* (2013.01); *H04J 1/12* (2013.01)

(58) Field of Classification Search
USPC .................................................. 708/309, 404
See application file for complete search history.

(56) References Cited

U.S. PATENT DOCUMENTS

| 4,298,985 | A | * | 11/1981 | Ballard et al. ................. 375/328 |
| 4,345,334 | A |   | 8/1982  | Nordahl |
| 4,414,661 | A | * | 11/1983 | Karlstrom ..................... 370/332 |
| 4,878,035 | A | * | 10/1989 | Vendely et al. ............... 332/101 |
| 4,896,369 | A | * | 1/1990  | Adams et al. ................ 455/13.4 |
| 5,184,350 | A | * | 2/1993  | Dara ............................. 370/466 |

(Continued)

OTHER PUBLICATIONS

International Search Report, dated Oct. 4, 2011, from corresponding PCT application.

*Primary Examiner* — Bunjob Jaroenchonwanit
(74) *Attorney, Agent, or Firm* — Young & Thompson

(57) ABSTRACT

A terminal (10) includes elements for transmitting data towards a station (20) in the form of radio signals, the radio signals being transmitted using a frequency resource (MC) shared between a plurality of terminals (10), characterized in that the terminal is configured to emit radio signals, the instantaneous frequency spectrum of which has a bandwidth (TOB) that is significantly lower than a frequency drift of a frequency synthesis unit of the terminal. Also disclosed are a method for using a frequency resource, a method for manufacturing terminals (10) and a telecommunication system (1).

13 Claims, 4 Drawing Sheets

(56) References Cited

U.S. PATENT DOCUMENTS

| | | | |
|---|---|---|---|
| 5,295,138 A | | 3/1994 | Greenberg et al. |
| 5,532,760 A | * | 7/1996 | Inoue .......................... 348/729 |
| 5,838,226 A | * | 11/1998 | Houggy et al. ............ 340/12.32 |
| 5,840,040 A | * | 11/1998 | Altschuler et al. ............ 600/545 |
| 6,075,829 A | * | 6/2000 | Hayashi et al. ............... 375/344 |
| 6,366,174 B1 | * | 4/2002 | Berry et al. ..................... 331/78 |
| 6,369,747 B1 | * | 4/2002 | Ashihara ......................... 342/70 |
| 6,546,248 B1 | * | 4/2003 | Jou et al. ....................... 455/434 |
| 6,560,293 B1 | * | 5/2003 | Alelyunas et al. ............ 375/261 |
| 6,731,223 B1 | | 5/2004 | Partyka |
| 7,539,166 B2 | * | 5/2009 | Do et al. ....................... 370/335 |
| 7,885,651 B2 | * | 2/2011 | Akihara ........................ 455/423 |
| 8,509,722 B2 | * | 8/2013 | Popoli ........................... 455/255 |
| 2002/0080954 A1 | * | 6/2002 | Felder et al. .................. 379/386 |
| 2006/0023629 A1 | * | 2/2006 | Kim et al. ..................... 370/235 |
| 2006/0068801 A1 | * | 3/2006 | Usuda et al. .................. 455/450 |
| 2006/0120404 A1 | * | 6/2006 | Sebire et al. .................. 370/469 |
| 2008/0084953 A1 | * | 4/2008 | Adduci .......................... 375/349 |
| 2008/0254755 A1 | * | 10/2008 | Kato .............................. 455/118 |
| 2009/0016236 A1 | * | 1/2009 | Alcala et al. .................. 370/253 |
| 2009/0207409 A1 | * | 8/2009 | Yao ................................ 356/365 |
| 2009/0225164 A1 | * | 9/2009 | Renkis ........................... 348/143 |
| 2010/0098036 A1 | * | 4/2010 | Li ................................... 370/338 |
| 2010/0246654 A1 | * | 9/2010 | Page et al. ..................... 375/224 |
| 2012/0078130 A1 | * | 3/2012 | Ahmed et al. ................. 600/508 |

* cited by examiner

METHOD FOR USING A SHARED FREQUENCY RESOURCE, METHOD FOR MANUFACTURING TERMINALS, TERMINALS AND TELECOMMUNICATION SYSTEM

BACKGROUND OF THE INVENTION

1. Field of the Invention

The present invention relates to the field of telecommunication and in particular to that of wireless telecommunication. The present invention is more particularly related to the multiplexing of radio signals emitted by different terminals sharing the same frequency resource.

2. Description of the Related Art

The main known techniques for multiplexing radio signals in current telecommunication networks, to enable different terminals to access a shared frequency resource to communicate with a station, consist mainly in multiplexing said radio signals:

- by emitting them in different frequency subbands ("Frequency Division Multiple Access" or FDMA);
- by emitting them at different time intervals ("Time Division Multiple Access" or TDMA);
- by spreading their frequency spectrum by means of codes that are generally substantially orthogonal to each other ("Code Division Multiple Access" or CDMA).

Each of these techniques is based on mechanisms for assigning physical channels (frequency subbands, time intervals, spreading codes) to the different terminals which are often very complex, dynamic and centralized at the station or, more generally, at the network.

These assignment mechanisms require a strict time and/or frequency synchronization of a terminal with the station on the one hand and with the other terminals on the other hand, via an often complex and energy-consuming protocol, as this requires each terminal to be regularly switched on.

It is understood that these assignment mechanisms are incompatible with very low data rate telecommunication systems (a few bits per second), as these data rates are insufficient to maintain synchronization between the terminals and the station, and/or with very long-range telecommunication systems (several tens of kilometers in rural areas), as maintaining synchronization between distant terminals is very difficult (propagation delay, Doppler effect, etc.).

This invention aims at overcoming the aforementioned problems, and in particular at proposing a method for using a frequency resource shared between several terminals, that is both simple and inexpensive to implement, while guaranteeing a low level of collisions between radio signals emitted by different terminals.

One advantageous, although in no way limitative application of this invention involves low data rate information collection systems such as sensor networks wherein sensors repeatedly emit data representative of the physical parameter measured to a data collection station. One non-limitative example involves sensors embedded in electric or gas meters, emitting electricity or gas consumption data to a collection station in order to establish an invoice for this consumption.

According to a first embodiment, this invention relates to a terminal comprising means for transmitting data towards a station in the form of radio signals, said radio signals being transmitted using a frequency resource shared between a plurality of terminals. Said terminal is configured to emit radio signals, the instantaneous frequency spectrum of which has a bandwidth that is significantly lower than a frequency drift of a frequency synthesis means of said terminal.

According to specific embodiments, the terminal comprises one or several of the following characteristics, which can be considered alone or according to any technically possible combination.

Preferably, the terminal is configured in a static manner to transmit radio signals in a single predefined frequency subband of the frequency resource, or according to a single predefined sequence of frequency subbands of said frequency resource.

Preferably, the terminal is configured to determine, in an autonomous manner, when to emit radio signals in a frequency subband of the shared frequency resource.

Preferably, the terminal is configured to determine, in an autonomous manner, what power to use to emit radio signals in a frequency subband of the shared frequency resource.

Preferably, the radio signals are signals that have been previously spread by means of a spreading code. Advantageously, said terminal is configured in a static manner to use a single predefined spreading code or a predefined sequence of spreading codes.

According to a second embodiment, this invention relates to a telecommunication system comprising:
- a plurality of terminals according to the invention,
- at least one station comprising means for detecting and decoding radio signals emitted simultaneously in different frequency subbands of the shared frequency resource.

Preferably, the telecommunication system station comprises a FFT block adapted to determine a frequency spectrum of the shared frequency resource and a detector block adapted to search for at least one energy peak in the frequency spectrum determined, likely to correspond to a radio signal emitted by a terminal.

According to a third embodiment, this invention relates to a method for using a frequency resource shared between a plurality of terminals to emit data in the form of radio signals to at least one station, wherein each terminal emits radio signals, the instantaneous frequency spectrum of which has a bandwidth that is significantly lower than a frequency drift of a frequency synthesis means of said terminal.

According to specific embodiments, the method for using a shared frequency resource comprises one or several of the following characteristics, which can be considered alone or according to any technically possible combination.

Preferably, each terminal is previously configured in a static manner to emit radio signals in a single predefined frequency subband of the frequency resource, or according to a single predefined sequence of frequency subbands of said frequency resource.

Preferably, each terminal determines, in an autonomous manner, when to emit radio signals in a frequency subband of the shared frequency resource.

Preferably, each terminal determines, in an autonomous manner, what power to use to emit radio signals in a frequency subband of the shared frequency resource.

According to a fourth embodiment, this invention relates to a method for manufacturing terminals designed to use a shared frequency resource. For the manufacture of each terminal, said method of manufacture comprises the following steps:
- obtaining at least one random number or pseudo-random number according to at least one generator generating random or pseudo-random numbers distributed according to a substantially uniform law, determining a frequency subband of the frequency resource or a sequence of frequency subbands of said frequency resource according to the at least one random or pseudo-random number, equipping said terminal with a frequency synthesis means configured in a static manner to transmit radio signals only in the frequency subband, or only according to the predefined sequence of frequency subbands of said frequency resource determined according to the at least one random or pseudo-random number.

According to specific embodiments, the method of manufacture comprises one or several of the following characteristics, which can be considered alone or according to any technically possible combination.

Preferably, each terminal is equipped with a frequency synthesis means, the frequency drift of which is significantly greater than a predefined bandwidth of the instantaneous frequency spectrum of the radio signals to be emitted by this terminal.

Preferably, the step for determining the frequency subband of the frequency resource or the sequence of frequency subbands of said frequency resource to be assigned in a static manner to a terminal comprises at least one of the following steps:

selecting a fractional division value for a fractional frequency synthesizer, selecting a control voltage value to be applied to a voltage-controlled oscillator, selecting a group of components to be installed within the terminal to modify the oscillation frequency of an oscillator, selecting a physical patch to be made on at least one component to modify the oscillation frequency of an oscillator.

BRIEF DESCRIPTION OF THE DRAWINGS

The invention shall be better understood after reading the following description, intended for illustration purposes only and not intended to limit the scope of the invention, with reference to the following figures which represent.

DETAILED DESCRIPTION OF THE PREFERRED EMBODIMENTS

Figure 1:
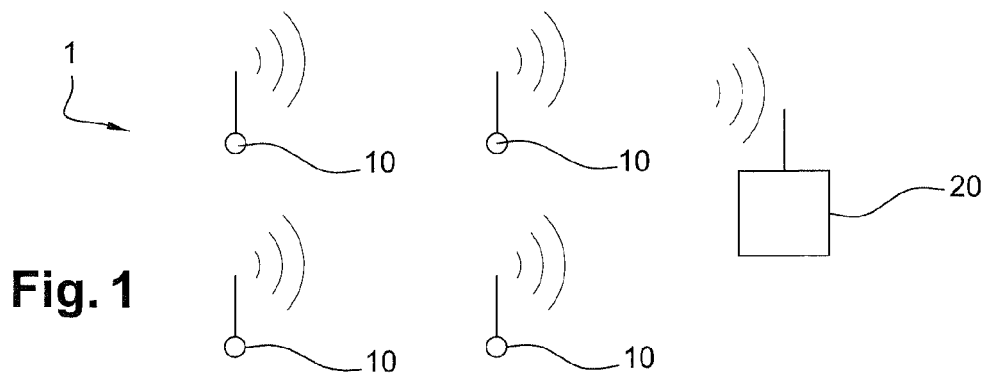
FIG. 1: a schematic representation of a telecommunication system comprising a station and a plurality of terminals.

FIG. 1 represents, in a very schematic manner, a telecommunication system 1 comprising several terminals 10 and one station 20.

The invention is related to a method for using a frequency resource shared between several terminals 10 to emit data in the form of radio signals to the station 20.

In the context of the invention, "station" is understood in a general manner as a receiving device adapted to receive radio signals in all of the shared frequency resource. For example, station 20 is any one of terminals 10 or a specific device such as a wired or wireless telecommunication network access point, centralizing the data emitted by each of the terminals 10.

"Radio signal" is understood as an electromagnetic wave propagated via wireless means, the frequencies of which are comprised within the traditional radio wave spectrum (several hertz to several hundred gigahertz) or in adjacent frequency bands.

It should be noted that this invention mainly considers the case of data emitted by the terminals 10 to the station 20. The potential emission of data from the station 20 to the terminals 10 is outside the scope of the invention.

The terminals 10 comprise means for emitting radio signals, considered as known by one of ordinary skill in the art. Furthermore, a terminal 10 preferably comprises a device such as a programmed computer, including inter alia a processor connected to one or several electronic memories in which software code instructions are stored. According to some embodiments, a terminal 10 also comprises one or several specialized electronic circuits, such as ASIC or FPGA circuits, etc.

The station 20 comprises means for receiving radio signals, considered as known by one of ordinary skill in the art. Furthermore, the station 20 preferably comprises a device such as a programmed computer, including inter alia a processor connected to one or several electronic memories in which software code instructions are stored. According to some embodiments, the station 20 also comprises one or several specialized electronic circuits, such as ASIC or FPGA circuits, etc.

The invention is based on an FDMA frequency multiplexing principle, i.e. the radio signals are emitted in different frequency subbands of the frequency resource.

In the description herein below, the non-limitative example is provided of a frequency resource consisting in a single frequency band, referred to as the "Multiplex Channel" MC, so that the reference MC will be used indifferently for the multiplex channel and the frequency resource. This does not, in other examples not detailed herein below, prevent the frequency resource from being broken down into several different multiplex channels, potentially non-adjacent to each other.

The MC frequency resource has a frequency bandwidth referred to as "Multiplex Channel Bandwidth" MCB and a central frequency referred to as "Multiplex Channel Central Frequency" MCCF.

Figure 2:
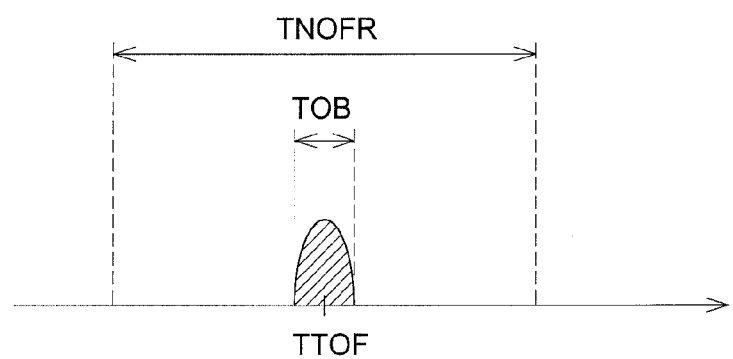
FIG. 2: a schematic representation of one example of the occupation of a frequency subband by a radio signal emitted by a terminal.

FIG. 2 schematically represents a frequency subband used by a terminal 10.

Such a frequency subband is mainly defined by its central frequency, referred to as "Terminal Typical Operating Frequency" TTOF and by its bandwidth, referred to as "Terminal Natural Operating Frequency Range" TNOFR. The terminal natural operating frequency range TNOFR of a terminal 10 corresponds to the frequency bandwidth effectively occupied by a radio signal over time, taking into account a frequency drift of the frequency synthesis means of this terminal 10 and taking into account the instantaneous spectral bandwidth of the radio signals emitted by said terminal 10, referred to as "Terminal Occupied Bandwidth" TOB.

The terminal natural operating frequency range TNOFR is therefore substantially equal to the terminal occupied bandwidth TOB to which is added the frequency drift D (i.e. TOB+D), a frequency drift D of 1 kilohertz (kHz) being considered as corresponding to an accuracy of ±500 Hz (i.e. ±D/2) for the terminal typical operating frequency TTOF.

The terminal occupied bandwidth TOB is, for example, measured as being the band at −10 decibels (dB), i.e. as being all frequencies for which the energy measured presents an attenuation of between 0 dB and −10 dB compared to the maximal energy measured for a frequency in the band of the radio signal. In other words, the frequencies for which the energy is attenuated by more than −10 dB (i.e. −20 dB, −30 dB, etc.) are not taken into account when measuring the terminal occupied bandwidth TOB. It should be noted that other measurement rules can be used to measure the terminal occupied bandwidth TOB (for example band at −30 dB) and the choice of a specific measurement rule is not considered to limit the scope of the invention.

The frequency drift of the frequency synthesis means of the terminal 10 causes the instantaneous central frequency of the spectrum of the radio signals emitted by the terminal 10, referred to as the "Terminal Real Operating Frequency" TROF, to potentially be substantially different from the terminal typical operating frequency TTOF.

Figure 3:
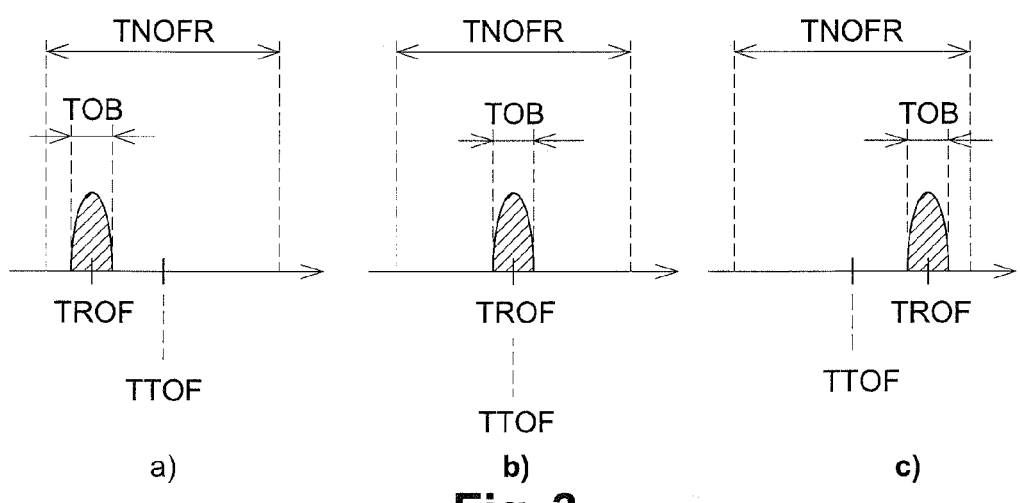
FIG. 3: a schematic representation of one example of variation, according to the temperature, of the occupation of a frequency subband by a terminal.

FIG. 3 illustrates this frequency drift between the terminal real operating frequency TROF compared to the terminal typical operating frequency TTOF, for example caused by temperature. Parts a), b) and c) represent the terminal real operating frequency TROF in the terminal natural operating frequency range TNOFR for three different temperatures.

Preferably, the instantaneous frequency spectrum of the radio signals emitted by the terminal 10 has a terminal occupied bandwidth TOB that it significantly lower than the frequency drift of a frequency synthesis means of this terminal 10. "Significantly lower than" is understood as meaning that the terminal occupied bandwidth TOB is at least five times lower than the terminal natural operating frequency range TNOFR. In other words, the terminal natural operating frequency range TNOFR of the terminal 10 is, due to the frequency drift of the frequency synthesis means of said terminal, at least five times greater than the bandwidth TOB of the instantaneous frequency spectrum of the radio signals emitted by said terminal.

According to specific embodiments, the terminal occupied bandwidth TOB is at least ten times lower than the terminal natural operating frequency range TNOFR, or even one hundred times lower than the latter.

It is understood that the smaller the ratio between the terminal occupied bandwidth TOB and the terminal natural operating frequency range TNOFR, the greater the frequency drift. However, it is also understood that the greater the frequency drift allowed, the more low-cost frequency synthesis means can be implemented in each of the terminals 10.

Furthermore, the lack of intrinsic frequency stability of the terminals 10 (i.e. their frequency drift) can be statistically used in a positive way to reduce the probability of collision between radio signals emitted by different terminals 10.

Indeed, as described herein below, the terminal typical operating frequencies TTOF of the different terminals 10 will preferably be determined according to a random or pseudo-random number generator in such a way that the different terminals 10 are not guaranteed to be assigned different terminal typical operating frequencies TTOF and/or of frequency subbands that do not overlap each other. It is therefore understood that by using radio signals with a terminal occupied bandwidth TOB that is significantly lower than the terminal natural operating frequency range TNOFR, the frequency drift will advantageously contribute to the frequency multiplexing of the radio signals emitted by the different terminals 10 in at least partially overlapping frequency subbands.

It is understood that the smaller the TOB/TNOFR ratio between the terminal occupied bandwidth TOB and the terminal natural operating frequency range TNOFR, the lower the probability of collision occurring between radio signals emitted by different terminals 10.

As mentioned, very low data rate systems, for example sensor networks, are one preferred, yet in no way limitative application of the invention. For a very low data rate system, the terminal occupied bandwidth TOB is, for example, of the order of several Hertz to several hundred Hertz.

The terminal natural operating frequency range TNOFR depends on the technology implemented to synthesize the terminal typical operating frequencies TTOF. With frequency synthesis means comprising a crystal oscillator, accuracy will for example vary from 2 to 40 ppm ("parts per million") so that, for a terminal typical operating frequency TTOF equal to 1 gigahertz, the frequency drift D will be substantially of the order of 2 kHz (±1 kHz for an accuracy of 2 ppm) to 40 kHz (±20 kHz for an accuracy of 40 ppm). In this case, the terminal natural operating frequency range TNOFR will be substantially of the order of 2 kHz to 40 kHz. More precisely, for a terminal occupied bandwidth TOB of 100 Hz, the terminal natural operating frequency range TNOFR will be of the order of 2.1 kHz to 40.1 kHz and the TNOFR/TOB ratio will therefore be substantially of the order of 21 to 401.

In one preferred embodiment of the method for using the frequency resource MC, each terminal is previously configured in a static manner to emit radio signals in a single frequency subband of the frequency resource MC, or according to a single predefined sequence of frequency subbands of said frequency resource to be used successively to transmit radio signals.

It should be noted that a predefined sequence is a sequence of frequency subbands that the terminal 10 will use successively, in a cyclic manner, when it has radio signals that it should transmit. "In a cyclic manner" is understood as meaning that when the terminal will have used the last frequency subband of the sequence, it will reuse the first frequency subband of the sequence for its next transmission. Preferably, different sequences are used to configure each of the terminals 10 so as to reduce the probability of collision occurring between radio signals emitted by different terminals 10 in the same frequency subband.

It is understood that by forcing each terminal 10 to emit in a single frequency subband or according to a predefined sequence of frequency subbands, configuration takes place on a single occasion for all terminals, and each terminal 10 is adapted to determine, in an independent manner, a frequency subband to be used to emit radio signals.

"On a single occasion for all terminals" is understood as meaning that a terminal 10, once configured, always uses the same frequency subband or the same sequence of frequency subbands by default, independently from the station 20, i.e. without frequency synchronization with said station 20 and without negotiating with said station 20 for permission to use a frequency subband. In other words, the configuration of a terminal 10, and thus the assignment of a frequency subband or of a sequence of frequency subbands to this terminal 10, is static.

This however does not prevent terminal 10 from being reconfigured in time, in particular if it later appears that certain frequency subbands are unusable due to the presence, in these frequency subbands, of parasitic signals the level of which does not enable the station 20 to correctly decode the radio signals transmitted by the terminals 10. Such a reconfiguration can, for example, take place by updating a software embedded in a terminal 10 or by modifying, after being returned to the factory, some of the terminal's 10 electronic components.

Preferably, each terminal 10 determines, in an independent manner, when to emit the radio signals in a frequency subband assigned to said terminal in a static manner, without temporally synchronizing with said station 20 and without negotiating with said station 20 for permission to use this frequency subband at a given time. In one alternative embodiment, a terminal 10 can implement a prior activity search mechanism on a frequency subband assigned to said terminal in a static manner, and condition the emission of a radio signal to the non-detection of radio activity in this frequency subband.

In one alternative embodiment, the radio signals are preferably signals that have been previously spread by means of a spreading code. Preferably, each terminal 10 is configured in a static manner to use a single predefined spreading code or a predefined sequence of spreading codes.

This invention also relates to a method for manufacturing terminals 10, wherein each terminal 10 is configured in a static manner to emit radio signals in a single frequency subband of the shared frequency resource MC or according to a single predefined sequence of frequency subbands.

A terminal 10 is essentially configured by equipping this terminal 10 with suitable software and/or hardware means. Software configuration, for example, takes place by storing software code instructions in a non-volatile electronic memory of the terminal 10, these instructions which, when run by a processor of the terminal 10, ensure that radio signals are emitted in the single frequency subband assigned to the former, or according to the single predefined sequence of frequency subbands assigned to said terminal. Hardware configuration, for example, takes place by installing specific discrete electronic components and/or specialized electronic circuits when manufacturing said terminal 10.

The manufacture of the terminals 10 of the system 1 should guarantee that the terminals 10 use frequency subbands, the terminal typical operating frequencies TTOF of which are spread in a substantially uniform manner in the shared frequency resource MC.

Preferably, for the manufacture of each terminal 10, the manufacturing method comprises the following steps:
   obtaining at least one random number or pseudo-random number according to at least one generator generating random or pseudo-random numbers distributed according to a substantially uniform law,
   determining a terminal typical operating frequency TTOF or a sequence of terminal typical operating frequencies TTOF according to the at least one random or pseudo-random number,
   equipping the terminal 10 with a frequency synthesis means configured in a static manner to transmit radio signals only in the frequency subband around the terminal typical operating frequency TTOF determined, or only according to the predefined sequence of frequency subbands around the terminal typical operating frequencies TTOF determined.

As previously stated, each terminal 10 is preferably equipped with a frequency synthesis means, the frequency drift of which is significantly greater than the terminal occupied bandwidth TOB of the radio signals being emitted by this terminal 10 so that the terminal occupied bandwidth TOB is at least five times lower than the terminal natural operating frequency range TNOFR.

During the step for obtaining at least one random or pseudo-random number, any type of generator can be implemented generating random or pseudo-random numbers distributed according to a substantially uniform law, the choice of a specific generator constituting an alternative embodiment of the invention.

The frequency synthesis means, with which the terminals 10 are equipped, preferably comprise at least one crystal oscillator. According to other examples, the frequency synthesis means comprise, for example, one or several resonator oscillators such as SAW, BAW or LC oscillators, etc. considered as known by one of ordinary skill in the art.

For frequency synthesis means comprising at least one crystal oscillator, the following frequency synthesis architectures can be cited for the purposes of illustration only and not intended to limit the scope of the invention:
   a direct multiplied or non-multiplied crystal oscillator,
   a crystal oscillator followed by a synchronous oscillator (on or not on a harmonic of the crystal oscillator),
   a crystal oscillator assembled in reference to a fractional or whole "Phase Locked Loop" (PLL) synthesizer, combined with a "Voltage Controlled Oscillator" (VCO).

Static configuration of the terminals 10, according to one or several random or pseudo-random number generators, takes place according to the following general principle.

An interval of values is defined and matched with the shared frequency resource MC. "Matched" is understood as meaning that each value in the predefined interval is associated with a frequency in the shared frequency resource MC.

Preferably, this is limited to a number N of possible terminal typical operating frequencies $TTOF_n$, $1 \leq n \leq N$, which are advantageously regularly distributed in the shared frequency resource MC, for example substantially spaced by MCB/N. The predefined interval is therefore a set Ev of N possible discrete values.

For a terminal 10 being configured, the configuration process comprises a step for obtaining a random number or pseudo-random number value included in the set Ev, so that the probability of a specific value occurring in said set Ev is substantially equal to 1/N. It should be noted that, in an equivalent manner, said generator can be previously implemented to determine a sequence of values in the set Ev of N values, which is memorized. For each new terminal 10 being configured, the next value in the previously memorized sequence is used and, when the last value of said sequence is reached, the next terminal 10 is configured with the first value of said sequence.

The conversion of a given value, in the set Ev of N values into a given terminal typical operating frequency TTOF associated with this value, depends on the technology used for the frequency synthesis means. From the value obtained in the set Ev, the method comprises a step for selecting the parameters that will be used to configure the terminal 10 so as to emit radio signals around the terminal typical operating frequency associated with this value. Non-limitative examples of parameters selected are provided below for different types of frequency synthesis means.

If the frequency synthesis means comprise a fractional synthesizer, each terminal typical operating frequency $TTOF_n$, $1 \leq n \leq N$, can be obtained by programming the fractional synthesizer with a predefined fractional division value $D_n$, $1 \leq n \leq N$. A given value n0, in the set Ev, corresponds to a terminal typical operating frequency value $TTOF_{n0}$, and is associated with a fractional division value $D_{n0}$. The terminal 10 is configured so as to program the fractional synthesizer with a fractional division value $D_{n0}$.

If the frequency synthesis means do not comprise a fractional synthesizer but are mainly comprised of an oscillator, several different approaches are possible for configuring the terminal 10 to use a specific terminal typical operating frequency $TTOF_{n0}$. Some possible approaches are provided herein below by considering the non-limitative scenario of a crystal oscillator.

A first approach consists in considering different crystal oscillators, with each crystal oscillator being adapted to provide one of the possible terminal typical operating frequencies $TTOF_n$, $1 \leq n \leq N$.

A second approach consists in modifying the oscillation frequency of a crystal oscillator by means of a variable capacitor or other, at the electric terminals of which a voltage source of the terminal 10 applies a control voltage. Each terminal typical operating frequency $TTOF_n$, $1 \leq n \leq N$, is obtained by applying a predefined voltage value $V_n$, $1 \leq n \leq N$. A given value n0, in the set of N values, corresponds to a terminal typical operating frequency value $TTOF_{n0}$, and is associated with a voltage value $V_{n0}$. The terminal 10 is configured so that the voltage source forms a voltage value $V_{n0}$ at the voltage-variable capacitor's electric terminals.

Non-limitative examples are provided herein below of techniques for configuring a terminal 10 so that a voltage source of this terminal 10 generates a voltage value $V_{n0}$.

In the case of a voltage source mainly comprised of a digital/analogue (D/A) converter, the terminal 10 is configured so as to present, at the input of said D/A converter, a discrete value allowing to obtain, at the output of said D/A converter, the desired control voltage value $V_{n0}$; said discrete value is, for example, stored in a flash memory of the terminal 10.

In the event that the voltage value generated by the voltage source is mainly determined by an electric circuit, such as a resistive bridge or other, the control voltage value generated is mainly determined by the values of the components constituting said electric circuit. A control voltage value $V_{n0}$ is obtained by suitably modifying the values of the components forming said electric circuit. This modification takes place a priori or a posteriori:

a priori modification: N groups of components with different values are considered, with each group enabling a voltage value $V_n$ to be obtained from the N possible values. The desired control voltage value $V_{n0}$ is selected according to the value obtained in the set Ev, and the components of the group substantially enabling a voltage value $V_{n0}$ to be obtained, are installed within the terminal 10 during manufacture.

a posteriori modification: in the event that a group of components is already installed within the terminal 10, the value of at least one of these components is modified. Such a modification takes place via a simple manipulation (manually or using a programmed robot) to the component if this is a variable component (variable resistor, capacitor or induction coil), or via a physical patch applied to said component, for example by means of a laser handled by a programmed robot.

A third approach for modifying the oscillation frequency of a crystal oscillator consists in directly modifying the characteristics of said crystal oscillator. Such a modification takes place, for example, via a physical patch applied to at least one passive component within the crystal oscillator (capacitor, induction coil), for example by means of a laser handled by a programmed robot, or even by mechanically forming an induction coil within said crystal oscillator by a programmed robot.

It should be noted that, in order to obtain a desired terminal typical operating frequency $TTOF_{n0}$, the aforementioned examples can also be combined. Such a combination may even be required in some cases if a single solution cannot scan the entire shared frequency resource MC and/or does not provide sufficient accuracy to differentiate between adjacent terminal typical operating frequencies (this is the case if a given solution does not provide an accuracy level below MCB/N).

For example, a number M of groups of components can be considered, M being lower than N, obtaining oscillation frequencies in different frequency ranges $P_m$ ($1 \leq m \leq M$) of the shared frequency resource MC, with each range $P_m$ comprising P possible terminal typical operating frequencies TTOF.

Figure 4:
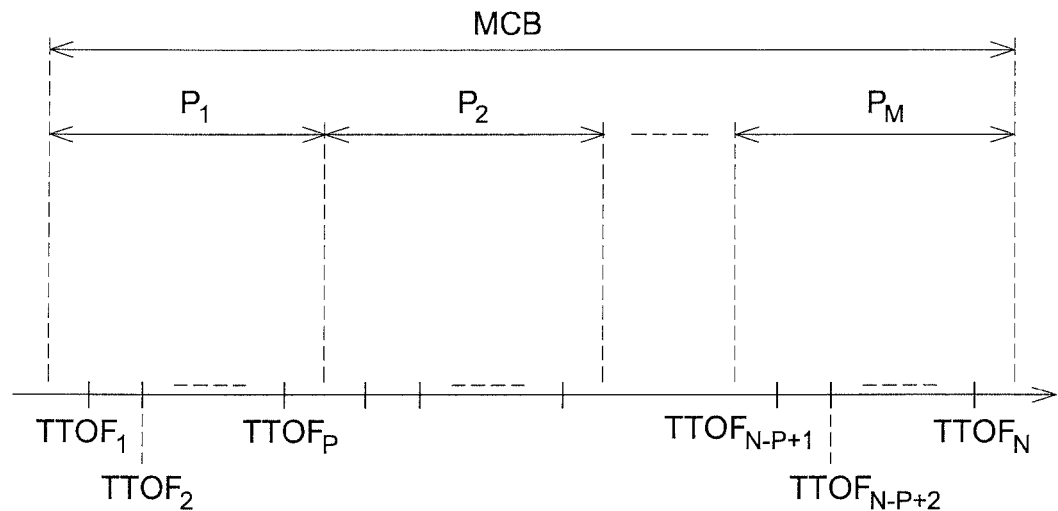
FIG. 4: a schematic representation of one example of dividing a frequency resource into multiple ranges.

FIG. 4 represents such a division of the shared frequency resource MC into M ranges $P_m$. According to a non-limitative example, M groups of passive components are defined, for the a priori modification of the oscillation frequency of a crystal oscillator. For a desired terminal typical operating frequency $TTOF_{n0}$, determined according to a random or pseudo-random number generator, the range $P_{m0}$ is determined, in which said terminal typical operating frequency $TTOF_{n0}$ can be found. The components of the group associated with this range are then installed in the terminal 10. Thereafter, the value of at least one of these components is modified a posteriori to obtain an oscillation frequency substantially equal to the terminal typical operating frequency $TTOF_{n0}$.

It should be noted that according to some embodiments, multiple random or pseudo-random number generators are used. According to one non-limitative example, a first random or pseudo-random number generator is used to select a range $P_{m0}$ of frequencies of the shared frequency resource MC, then a second random number generator is used to select a terminal typical operating frequency in the selected range $P_{m0}$.

The static configuration of a terminal 10 emitting radio signals according to a sequence takes place in an similar manner by selecting several terminal typical operating frequencies according to a random or pseudo-random number generator. According to one specific embodiment, a first random or pseudo-random number generator is used to select a range $P_{m0}$ of frequencies of the shared frequency resource MC, then a second random number generator is used to select a sequence of terminal typical operating frequencies all of which can be found in the range $P_{m0}$.

This invention also relates to the telecommunication system 1 comprising at least one station 20 and a plurality of terminals 10.

It is understood that, due to the fact that the used frequency synthesis means have a frequency drift which is significantly greater than the terminal occupied bandwidth TOB and, where applicable, due to the static configuration of the terminals 10 according to at least one random or pseudo-random number generator, the frequency subbands used by the different terminals 10 are not necessarily disjoint. Therefore, some of said frequency subbands can overlap each other in full or in part (for example if the terminal natural operating frequency range TNOFR is greater than the space between the possible terminal typical operating frequencies $TTOF_n$).

Figure 5:
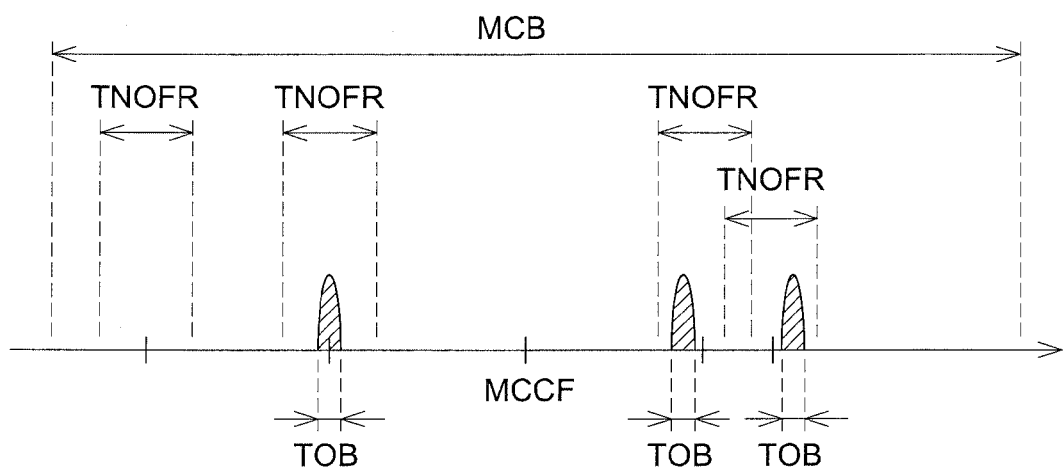
FIG. 5: a schematic representation of one example of statistical multiplexing of radio signals in the shared frequency resource.

FIG. 5 schematically represents an example of the statistical multiplexing of radio signals emitted by different terminals 10 in the shared frequency resource MC. FIG. 5 in particular illustrates, on the right-hand side, a case in which two frequency subbands with a range TNOFR, assigned to different terminals 10, partially overlap each other, and in which the frequency drift prevents a collision from occurring between the radio signals emitted by said terminals.

In FIG. 5, all terminals 10 have substantially the same terminal natural operating frequency range TNOFR. This however does not prevent, according to other examples, from having terminals 10 with different terminal natural operating frequency ranges.

In system 1, each terminal 10 is configured to determine, in an autonomous manner, when to emit radio signals in a frequency subband assigned to said terminal in a static manner and/or what power to use to emit radio signals in this frequency subband.

The station 20 preferably comprises means for detecting and decoding the radio signals emitted simultaneously by different terminals 10 in different frequency subbands.

Given that these radio signals have not been previously synchronized with the station 20, said station should be capable of detecting any radio signal appearing in a multiplex channel MC, and of determining whether these radio signals correspond to radio signals emitted by terminals 10 or to parasitic signals.

Preferably, the station 20 uses a "Software Defined Radio" (SDR) type of implementation, for example one or several of the following implementations, provided for the purpose of illustration only and not intended to limit the scope of the invention:

- generation of low-noise local internal oscillators for good selectivity between the terminal typical operating frequencies $TTOF_n$, using a direct or multiplied crystal oscillator, a crystal oscillator followed by a synchronous oscillator, a crystal oscillator controlling a whole wide-step PLL synthesizer or a crystal oscillator controlling a fractional PLL synthesizer and/or a DDS ("Direct Digital Synthesis") synthesizer,
- direct baseband translation with an oscillation frequency equal to the multiplex channel central frequency MCCF or to an MCCF multiple, or a heterodyne implementation, or a direct analogue/digital conversion around the multiplex channel central frequency MCCF,
- energy detection within the multiplex channel MC by means of an algorithm based on a "Fast Fourier Transform" (FFT),
- a digital baseband with a bandwidth MCB and sufficient dynamics to simultaneously process a plurality of signals.

Figure 6:
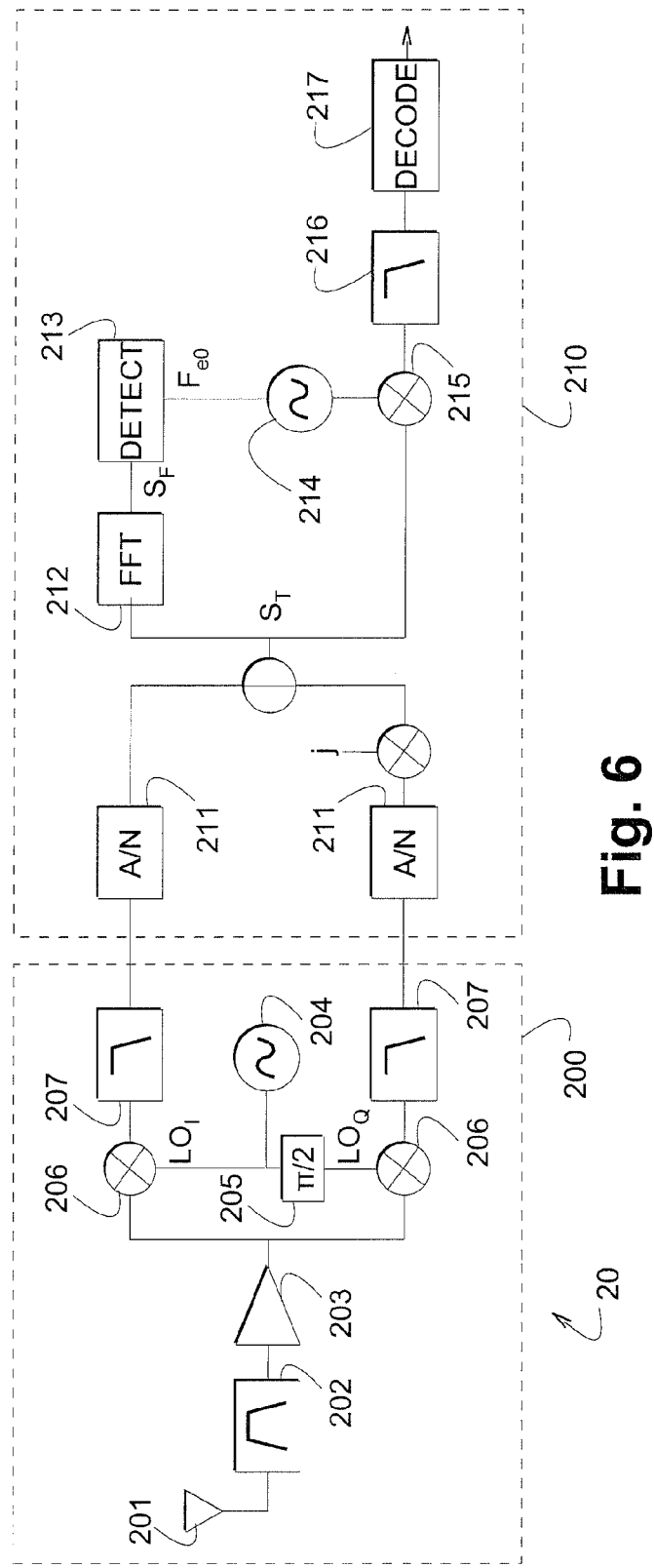
FIG. 6: a schematic representation of one embodiment of a telecommunication system station.

FIG. 6 schematically represents one preferred embodiment of the station 20. It should be noted that the station 20 can also comprise other elements not represented in said FIG. 6.

In this non-limitative example, the station 20 mainly comprises an analogue module 200 and a digital module 210.

As illustrated in FIG. 6, the analogue module 200 comprises inter alia:

- an antenna 201 adapted to receive radio signals in the multiplex channel MC,
- a band-pass filter 202, referred to as an "antenna filter", adapted to filter unwanted signals outside of the multiplex channel MC,
- a low-noise amplifier 203,
- a local oscillator 204 adapted to a substantially sinusoidal signal represented by $LO_I$, with a frequency substantially equal to the multiplex channel central frequency MCCF,
- a phase shifter 205 adapted to form a quadrature-phase replica of the signal $LO_I$, represented by $LO_Q$,
- two mixers 206 adapted to mix an output signal of the antenna filter 202 with the signal $LO_I$ and the signal $LO_Q$, respectively,
- two band-pass filters 207 at the output of each mixer 206 respectively, referred to as "anti-aliasing filters", with a cut-off frequency for example substantially equal to half of the multiplex channel bandwidth MCB (i.e. MCB/2).

As illustrated in FIG. 6, the digital module 210 comprises inter alia two analogue/digital (N/D) converters 211 adapted to sample the respective output signals of each anti-aliasing filter 207, for example with a sampling frequency substantially equal to the multiplex channel bandwidth MCB.

The output signals of the A/D converters 211 correspond respectively to the real part and the imaginary part of a complex signal represented by $S_T$. This complex representation is shown in FIG. 6 by the addition of the A/D converter 211 output signals, one of said signals being previously multiplied by the imaginary unit j (the imaginary unit being the complex number such that $j^2=-1$).

The digital module 210 then comprises multiple functional blocks.

Firstly, the digital module 210 comprises a FFT block 212, adapted to transform the complex signal $S_T$ from the time-domain to the frequency domain so as to obtain a complex signal $S_F$ representative of the frequency spectrum of the complex signal $S_T$.

The digital module 210 then comprises a detecting block 213, designed to search in the complex signal $S_F$ for frequencies for which energy peaks are obtained, likely to correspond to the presence of a radio signal emitted by a terminal 10.

Indeed, the station 20 does not necessarily know the frequencies used by the different terminals 10, in particular due to the fact that the terminal real operating frequency TROF of a terminal 10 can be very different from the terminal typical operating frequency TTOF of this terminal due to the frequency drift. The use of the FFT block 212 and of the detector block 213 therefore enables it to be determined whether the terminals 10 are emitting radio signals and, where applicable, enables their terminal real operating frequencies TROF to be estimated.

For this purpose, the FFT block 212 must be adapted to provide a complex signal $S_F$ with a granularity in the frequency domain enabling the detection of a radio signal with a terminal occupied bandwidth TOB. In the event that several terminal occupied bandwidths are possible, the minimal terminal occupied bandwidth $TOB_{MIN}$ is preferably used. For example, given a sampling frequency substantially equal to the multiplex channel bandwidth MCB, the FFT block 212 is for example configured to obtain frequency samples in the frequency range from 0 Hz to MCB, with a step size equal to $MCB/TOB_{MIN}$, i.e. for the elementary frequencies 0, $TOB_{MIN}$, $2 \cdot TOB_{MIN}$, $3 \cdot TOB_{MIN}$, ..., $MCB-TOB_{MIN}$.

The detector block 213 measures for example the energy for each elementary frequency. One detection criterion for detecting a signal emitted by a terminal 10 is for example verified when the energy measured for an elementary frequency is greater than a predefined threshold.

When a signal is detected by a detector block 213, for example around an elementary frequency value $F_{e0}$, said value $F_{e0}$ is provided at the input of a local variable oscillator block 214, which generates a sinusoidal signal of frequency $F_{e0}$ (in the form of a complex exponential).

The sinusoidal signal of frequency $F_{e0}$ is multiplied by the complex signal $S_T$ by means of a multiplier block 215. This multiplication enables the signal detected around the elementary frequency value $F_{e0}$ to be brought around the zero frequency 0 Hz.

The digital module 210 then comprises a low-pass filter block 216, with a cut-off frequency substantially equal to half of the terminal occupied bandwidth TOB (i.e. TOB/2). In the event that several terminal occupied bandwidths are possible, the maximal terminal occupied bandwidth $TOB_{MAX}$ is preferably used (i.e. a cut-off frequency substantially equal to $TOB_{MAX}/2$).

The digital module 210 then comprises a decoder block 217 adapted to extract the data emitted by a terminal 10. The exact implementation of the decoding block 217 depends on a predefined formatting protocol for the data emitted by the terminals 10, and implements means considered as known by one of ordinary skill in the art.

It should be noted that the detector block 213 can detect several elementary frequencies likely to correspond to signals emitted by terminals 10. For example, the detector block 213 can detect a number Ns of such elementary frequencies. In this case, the local variable oscillator blocks 214, the multiplier 215, the band-pass filter 216 and the decoder 217 are advantageously replicated Ns times in order to process in parallel the signals around each of the Ns elementary frequencies likely to be used by a terminal 10.

Advantageously, the station 20 comprises frequency tracking means for tracking the terminal typical operating frequency TTOF of a terminal 10 so as to follow its frequency drift. Advantageously, the station 20 comprises filtering means adapted to suit any terminal typical operating frequency TTOF processed.

Figure 7:
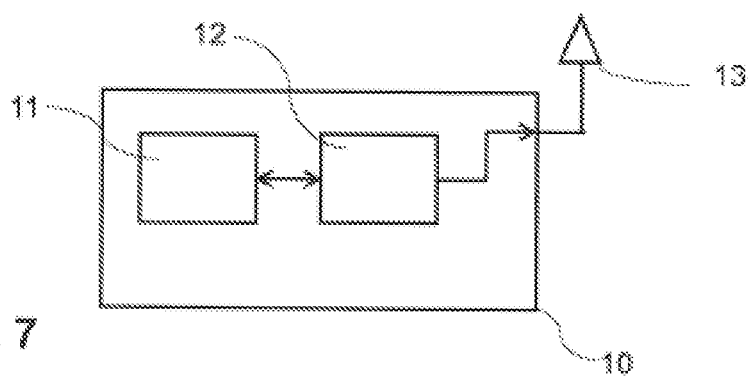
FIG. 7: a schematic representation of a terminal according to one embodiment of the invention.

FIG. 7 is a schematic representation of a terminal 10 according to one embodiment of the invention. The terminal 10 includes a frequency synthesis means 11, and a means 12, 13 for transmitting radio signals.

Figure 8:
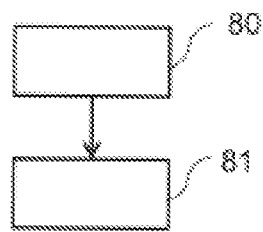
FIG. 8: a flow chart of a method for transmitting data according to one embodiment of the invention.

FIG. 8 is a flow chart of a method for transmitting data according to one embodiment of the invention. At operation 80, the frequency synthesis means 11 generates signals based on data to be transmitted to a station 20 and on an operating central frequency predefined in the frequency synthesis means 11. At operation 81, the means 12, 13 for transmitting radio signals transmits the generated signals in the form of radio signals.

Figure 9:
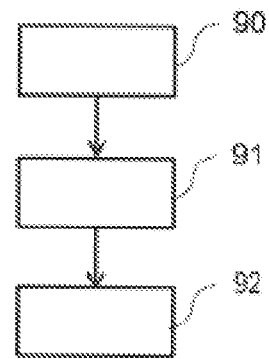
FIG. 9: a flow chart of a method of manufacturing according to one embodiment of the invention.

FIG. 9 is a flow chart of a method of manufacturing according to one embodiment of the invention. At operation 90, a random or pseudo-random number is generated. At operation 91, a frequency subband of the frequency resource is generated according to the random or pseudo-random number. At operation 92, the terminal 10 is equipped with the frequency synthesis means 11.

More generally, the scope of this invention is not limited to the aforementioned embodiments provided hereinabove as non-limitative examples, but on the contrary extends to all modifications within reach of one of ordinary skill in the art, in addition to their equivalents.

This invention therefore enables the statistical multiplexing of radio signals emitted by different terminals 10 sharing a same frequency resource MC in a decentralized manner. Indeed, the use of frequency synthesis means having a frequency drift that is greater than the instantaneous frequency spectrum bandwidth TOB of the radio signals emitted by the terminal 10 allows for a statistical frequency multiplexing.

Furthermore, the terminals 10 are advantageously configured in a static manner in the factory to emit radio signals in a single predefined frequency subband or according to a single predefined sequence of frequency subbands. The terminal typical operating frequencies $TTOF_n$ are assigned in a substantially random manner, which also allows for a statistical frequency multiplexing of the different radio signals. Such an approach can be described as FSFDMA for "Forced Statistical FDMA".

The invention does not require time and frequency synchronization of the terminals 10 with each other and with the station 20.

It is therefore understood that terminals 10 can be manufactured according to the invention at a low cost, which makes the invention particularly suited for low data rate systems such as sensor networks, for example systems using radio signals the instantaneous frequency spectrum bandwidth of which is between 5 Hz and 5 kHz, or preferably between 5 Hz and 500 Hz.

The telecommunication system according to the invention, and in particular the station 20, is slaved to the terminals 10 insofar as said terminals decide when and with what power to emit the radio signals, and insofar as said terminals are equipped with frequency synthesis means such that the frequency drift is far greater than the terminal occupied bandwidth TOB. Therefore, the station 20 does not generally know in advance when each terminal 10 is planning to emit a radio signal and does not know in advance the frequency subband that will be used by each terminal 10 (more particularly the terminal real operating frequency TROF of each terminal 10). The station 20 should therefore search for radio signals potentially emitted by terminals in the entire multiplex channel MC.

The invention claimed is:

1. A terminal comprising:
    frequency synthesis circuit configured to generator signals based at least on data to be transmitted to a station and on an operating central frequency predefined in the frequency synthesis circuit, the operating central frequency being a typical operating frequency (TTOF), each generated signal having
        a predefined bandwidth, the predefined bandwidth being an instantaneous spectral bandwidth (TOB) that is lower than a bandwidth of a frequency resource (MC) shared between a plurality of terminals, and
        a central frequency, the central frequency being a real operating frequency (TROF) that is substantially equal to the typical operating frequency (TTOF) to which a frequency drift of the frequency synthesis circuit is added, the frequency drift being significantly greater than the instantaneous spectral bandwidth (TOB); and
    an emitter configured to emit the generated signals in the form of radio signals having substantially the same central frequency and the same bandwidth of the generated signals.

2. The terminal according to claim 1, wherein all of the radio signals are configured to be emitted:
    (i) in a same and single predefined frequency subband (TNOFR) of said frequency resource (MC), or
    (ii) according to a same and single predefined sequence of frequency subbands (TNOFR) of said frequency resource (MC).

3. The terminal according to claim 1, further comprising a determination processor configured to determine, in an autonomous manner, when to emit radio signals in a frequency subband of the shared frequency resource (MC).

4. The terminal according to claim 1, further comprising a determination processor configured to determine, in an autonomous manner, what power to use to emit radio signals in a frequency subband of the shared frequency resource (MC).

5. The terminal according to claim 1, further comprising an application processor configured to apply a single predefined spreading code or a predefined sequence of spreading codes to the signals before transmission of the signals.

6. A telecommunication system comprising:
the plurality of terminals according to claim 1; and
at least one station comprising a detector configured to detect and decode radio signals emitted simultaneously in different frequency subbands of the shared frequency resource (MC).

7. The system according to claim 6, wherein the station comprises
a Fast Fourier Transform (FFT) circuit to determine a frequency spectrum in the shared frequency resource (MC), and
a detector circuit to search for at least one energy peak in said determined frequency spectrum corresponding to one of the radio signals emitted by one of the terminals.

8. A method for transmitting data, by a terminal to at least one station, in the form of radio signals in a frequency resource (MC) shared between a plurality of terminals, the method comprising:
generating, by a frequency synthesis circuit, signals based at least on the data to be transmitted and on a predefined operating central frequency, the predefined central frequency being a typical operating frequency (TTOF), each generated signal having
a predefined bandwidth, the predefined bandwidth being an instantaneous spectral bandwidth (TOB) that is lower than a bandwidth of the frequency resource (MC), and
a central frequency, the central frequency being a real operating frequency (TROF) that is substantially equal to the typical operating frequency (TTOF) to which a frequency drift of the frequency synthesis circuit is added, the frequency drift being significantly greater than the instantaneous spectral bandwidth (TOB); and
emitting, by an emitter, the generated signals in the form of radio signals having substantially the same central frequency and the same bandwidth of the generated signals.

9. The method according to claim 8, wherein all of the radio signals are configured to be emitted by the terminal
(i) in a same and single predefined frequency subband (TNOFR) of the frequency resource (MC), or
according to a same and single predefined sequence of frequency subbands (TNOFR) of said frequency resource (MC).

10. The method according to claim 8, further comprising determining, by each terminal, in an autonomous manner, when to emit radio signals in a frequency subband of the shared frequency resource (MC).

11. The method according to claim 8, further comprising determining by each terminal, in an autonomous manner, what power to use to emit radio signals in a frequency subband of the shared frequency resource (MC).

12. A method for manufacturing telecommunication terminals designed to transmit radio signals in a shared frequency resource (MC), comprising, for the manufacture of each terminal:
generating at least one random number or pseudo-random number according to a substantially uniform distribution;
determining a frequency subband of the frequency resource (MC) or a sequence of frequency subbands of said frequency resource (MC) according to the at least one random or pseudo-random number, the determining the frequency subband of the frequency resource (MC) or the sequence of frequency subbands of said frequency resource (MC) to be assigned to the terminal comprising at least one of:
selecting a fractional division value for a fractional frequency synthesizer,
selecting a control voltage value to be applied to a voltage-controlled oscillator;
selecting a group of components configured for installation within the terminal to modify the oscillation frequency of an oscillator, and
selecting a physical patch configured to modify the oscillation frequency of an oscillator; and
equipping said terminal with a frequency synthesis circuit configured to generate radio signals in said determined frequency subband only, or according to said predefined sequence of frequency subbands only.

13. The manufacturing method according to claim 12, wherein for each terminal that is equipped with the frequency synthesis circuit, the frequency synthesis circuit has a frequency drift which is significantly greater than a predefined bandwidth (TOB) of an instantaneous frequency spectrum of the radio signals emitted by said terminal.

* * * * *